Figure 1:
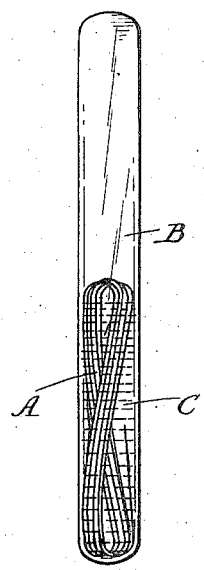

C. H. WATSON.
SURGICAL SUTURE AND LIGATURE AND METHOD OF PREPARING SAME.
APPLICATION FILED OCT. 29, 1915.

1,202,931.

Patented Oct. 31, 1916.

Witnesses:
Wm H. Hawkins.
R. B. Cavanagh.

Inventor
Cassius H. Watson
By his Attorneys,
Meyers, Cushman & Rea

UNITED STATES PATENT OFFICE.

CASSIUS H. WATSON, OF BROOKLYN, NEW YORK, ASSIGNOR, BY MESNE ASSIGNMENTS, TO DAVIS & GECK, INC., OF BROOKLYN, NEW YORK, A CORPORATION OF NEW YORK.

SURGICAL SUTURE AND LIGATURE AND METHOD OF PREPARING SAME.

1,202,931.     Specification of Letters Patent.     Patented Oct. 31, 1916.

Application filed October 29, 1915. Serial No. 58,525.

*To all whom it may concern:*

Be it known that I, CASSIUS H. WATSON, a citizen of the United States, residing at Brooklyn, in the county of Kings and State of New York, have invented new and useful Improvements in Surgical Sutures and Ligatures and Methods of Preparing Same, of which the following is a specification.

This invention relates to surgical sutures and ligatures and to the method of preparing the same.

In the manufacture of surgical sutures, especially those made of an animal substance, such as catgut, it is a practice to impregnate and sterilize the suture with a chemical germicide which will cause the implanted suture to exert a local antiseptic or germicidal action on the tissues. At the present time iodin is a chemical agent widely used for sterilizing catgut, and experience has shown that while the use of iodin in this connection is advantageous in certain respects, it also possesses manifest and serious disadvantages. It is a well known fact that iodin is a powerful oxidizing agent, and catgut, being an organic substance, is naturally very easily oxidized by iodin. This entirely changes the chemical nature of the catgut, greatly weakening it, for it has been found that animal suture material treated with iodin suffers a loss of tensile strength. Furthermore, catgut sutures impregnated with iodin frequently produce more or less local irritation when implanted in surgical wounds, particularly if the patients are susceptible to iodism. Another serious objection incident to the iodization of catgut sutures is that the latter deteriorate when subjected to heat, thus making it impossible to boil the glass tubes in which the iodized gut is usually supplied. This is borne out by the fact that all manufacturers of iodized catgut very plainly warn users not to unduly raise the temperature of a tube of iodized catgut suture. This is because it has been found that when a tube of such sutures is boiled for the purpose of sterilizing the exterior preparatory to an operation, the gut will shrivel and burn, and be rendered unfit for use, due to the highly aggravated oxidizing or burning power of iodin. This burning action of iodin is independent of the fluid in which it is held in solution. That is, it may happen with a wet solvent, such as 95% alcohol, or with any of the dry solvents, such as chloroform. This necessitates recourse to chemical sterilization of the exterior of the tube, which is less convenient and also less efficacious. Age, or the presence of even slight traces of water, will also cause iodin to oxidize catgut even at ordinary temperatures. Another disadvantage incident to the use of iodin in this connection is that as a result of its action on the catgut, an acid (hydriodic acid) is formed which closely resembles muriatic acid and which frequently produces harmful irritation when the suture is implanted in the wound. The hydriodic acid also exerts a very marked weakening action upon the gut.

In order to obviate the above recited disadvantages incident to the use of iodin, I treat the sutures with a chemical compound, potassium mercuric iodid, which possesses great germicidal potency and low toxicity with no irritant action, is stable when subjected to sterilizing temperatures, and will not only not impair the strength of the suture material, but, on the contrary, will actually increase the tensile strength of the catgut strands, so that sutures so treated will stand an appreciably greater strain than do the plain or untreated grades. This potassium mercuric iodid is a distinct and definite chemical compound and not a mere mechanical mixture of potassium iodid and mercuric iodid. It is a true neutral salt, having no acid or caustic action nor any oxidizing or reducing powers.

I have found by actual experience that potassium mercuric iodid in an alcoholic solution in a dilution of one to one thousand has more than ten times the germicidal efficiency of one to one thousand solution of iodin in alcohol; and that catgut treated with potassium mercuric iodid is devoid of the irritant action encountered in the use of iodized catgut. Furthermore, the impregnating of the catgut sutures with potassium mercuric iodid, by increasing the tensile strength of the gut, offers a distinct advantage over the similar use of iodin, and catgut sutures impregnated with potassium mercuric iodid when sealed in tubes with chloroform or other suitable fluids will not shrivel, weaken, or oxidize, or deteriorate when the tubes are subjected to boiling.

My invention consists in the improved surgical suture and in the method of preparing the same, set forth in and falling within the scope of the appended claims.

Figure 2:
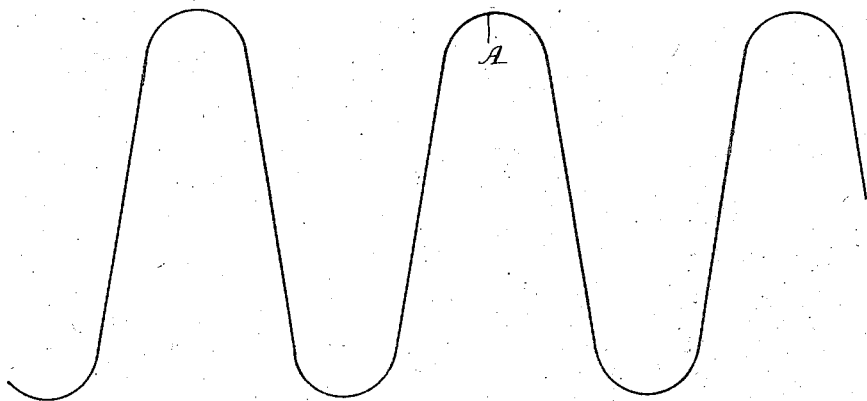

In the accompanying drawings, Figure 1 is a view in elevation of a glass tube showing sutures sealed therein. Fig. 2 is a view of the suture ready for use.

One manner of practising the invention is to make a solution consisting of potassium mercuric iodid in 95% alcohol, although I wish it to be understood that other fluids may be used in the place of alcohol, water being suitable for this purpose. The constituents of potassium mercuric iodid by weight are proportioned substantially as follows: mercuric iodid 908.88 parts, potassium iodid 332.04 parts, water 54.05 parts.

When a solution containing a proper percentage of the above described compound has been prepared, the catgut sutures, such as shown at A, are placed therein and permitted to soak for a suitable length of time or until the catgut is thoroughly impregnated and saturated. After the catgut so treated is removed from the potassium mercuric iodid solution, it is sealed in a tube B, as shown in Fig. 1, in alcohol or other suitable storing fluid, indicated at C. The catgut or suture having previously been impregnated with potassium mercuric iodid substantially as described, the fluid solution in which the suture is tubed either may or may not contain an additional amount of potassium mercuric iodid. In the treatment of the catgut suture, the latter may be impregnated in an aqueous solution of potassium mercuric iodid to which is added a very slight percentage of free potassium iodid, in order to prevent decomposition of the salt, but I wish it to be understood that any suitable solvent other than alcohol or water may be used in the preparation of the potassium mercuric iodid solution.

What I claim is—

1. A suture impregnated with potassium mercuric iodid.

2. A catgut suture treated with potassium mercuric iodid.

3. A suture impregnated with a solution including potassium mercuric iodid.

4. The herein described method of preparing surgical sutures consisting of subjecting the sutures to a bath in a solution of potassium mercuric iodid.

5. The herein described method of preparing surgical sutures which consists in subjecting the catgut suture to a bath of and impregnating it with a solution of potassium mercuric iodid.

In testimony whereof I have hereunto set my hand in presence of two subscribing witnesses.

CASSIUS H. WATSON.

Witnesses:
J. P. McLoven,
Clement Curd.